United States Patent [19]

Schoenhenz

[11] Patent Number: 5,243,176
[45] Date of Patent: Sep. 7, 1993

[54] IC CARD READER

[75] Inventor: Daniel Schoenhenz, Ballancourt, France

[73] Assignee: Compagnie Generale d'Automatisme CGA-HBS, Bretigny-sur Orge, France

[21] Appl. No.: 833,674

[22] Filed: Feb. 11, 1992

[30] Foreign Application Priority Data

Feb. 12, 1991 [FR] France .................. 91 01581

[51] Int. Cl.$^5$ .................................. G06K 13/00
[52] U.S. Cl. ............................ 235/475; 235/476; 235/479
[58] Field of Search .............. 235/473, 475, 479

[56] References Cited

U.S. PATENT DOCUMENTS 4,518,853 5/1985 Gabel et al. ..................... 235/479

FOREIGN PATENT DOCUMENTS 0230674 8/1987 European Pat. Off. .
0274684 7/1988 European Pat. Off. .
0295607 12/1988 European Pat. Off. .
0336330 10/1989 European Pat. Off. .
2638005 4/1990 France .

*Primary Examiner*—Harold Pitts
*Attorney, Agent, or Firm*—Sughrue, Mion, Zinn, Macpeak & Seas

[57] ABSTRACT

A card reader has a guide channel followed by a connector and it includes a cradle pivoting about a stationary axis, a roller whose axis is parallel to the stationary axis being mounted in the cradle with freedom to move in translation along a direction Δ perpendicular to the roller axis, said direction Δ being at an acute angle α to the direction in which the guide channel extends, the cradle including resilient return means urging the angle α to close and drive means acting on command and of greater power than said return means to urge said angle α to open. The roller includes resilient means urging it along the direction Δ towards the vertex of the angle α. When the reader is in the rest position, the roller obstructs said channel, when a card is fully inserted in the reader, at least a portion of the card remains outside the reader, the cradle being in abutment in a position where the angle α is less than the angle β whose tangent is equal to the coefficient of friction μ between the roller and the card. The drive means are powered after the card has been processed so as to open the angle α and enable the card to be withdrawn.

5 Claims, 2 Drawing Sheets

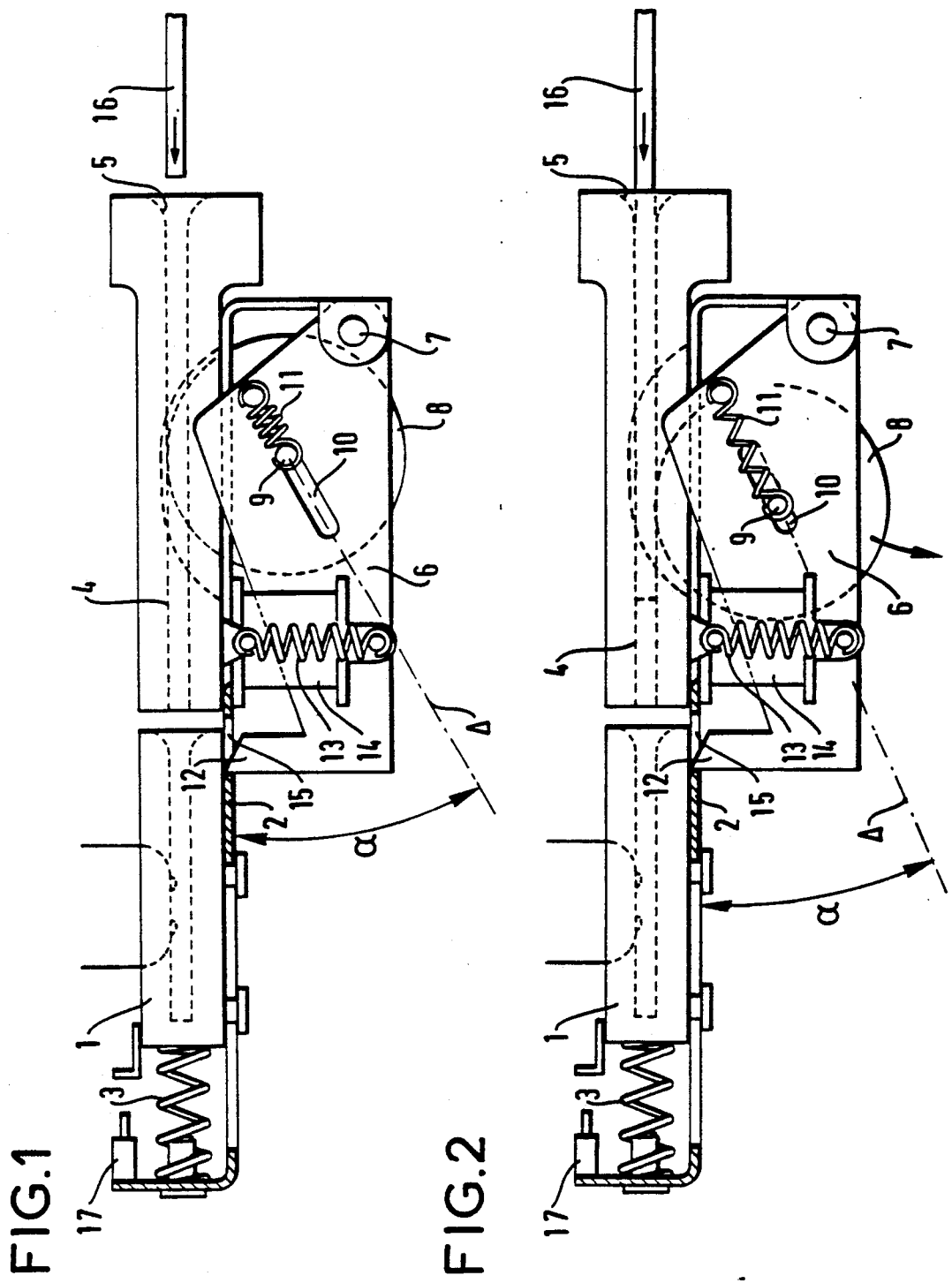

IC CARD READER

The invention relates to a reader device for an IC card.

BACKGROUND OF THE INVENTION

When an IC card is used in an apparatus, the user, i.e. the person holding the card, inserts it into the apparatus via an insertion slot. After it has been inserted a certain distance, card drive means take over and convey the card to a connector in such a manner that the card disappears from the reach and sight of the user and reappears only after the card has been processed.

An object of the present invention is to provide an IC card reader in which the end of the card remains in reach and in sight of the user during the operation of processing the card, but where extraction of the card from the reader during card processing is nevertheless either impossible or else made relatively difficult by increased resistance.

SUMMARY OF THE INVENTION

The present invention thus provides an IC card reader comprising an insertion slot followed by a guide channel at the end of which a standard connector is situated, wherein:

the reader includes a cradle pivoting about a stationary axis perpendicular to the direction of the guide channel and situated on one side of the insertion slot, and a roller whose axis extends parallel to said stationary axis being mounted in the cradle and being free to move in translation along a direction $\Delta$ perpendicular to its axis, said direction $\Delta$ being at an acute angle $\alpha$ relative to the direction of the guide channel;

said cradle includes resilient return means tending to close said angle $\alpha$, and drive means acting on control and more powerful than said return means tending to open said angle $\alpha$;

said roller includes resilient means pulling the roller along said direction $\Delta$ towards the line of intersection between the plane of the guide channel and the plane containing the axis of the roller and said direction $\Delta$;

in the rest position of the reader prior to a card being inserted therein, said roller obstructs said channel; and when a card is fully inserted in the reader, at least a portion of the card remains outside the reader, the cradle being in abutment in a position where said angle $\alpha$ is less than the angle $\beta$ whose tangent is equal to the coefficient of friction $\mu$ between said roller and said card, said drive means being powered after the card has been processed so as to open said angle $\alpha$ and enable the card to be withdrawn.

In a preferred embodiment, the standard connector is slidably mounted on a plate, insertion of a card into the reader causing the connector to move backwards and compressing a return spring.

This makes it possible to obtain partial ejection of the card after it has been processed and while power is being applied to said drive means enabling the cradle to be tilted in the opening direction through the angle $\alpha$. This partial ejection informs the user that the operation has ended.

The rear portion of said cradle may have a locking catch which, when the card is in its pushed-in position and in the absence of power being applied to said drive means, holds the connector in its pushed-back position.

In an embodiment where it is desired that extraction of the card during processing should be completely impossible, the roller surface is smooth.

In a second embodiment of the invention in which it is desired that extraction should remain possible but only with a large effort, the two ends of the roller have smooth surfaces while the central portion of the roller includes a series of flexible radial blades extending over a width not less than the width of the card.

BRIEF DESCRIPTION OF THE DRAWINGS

An embodiment of the invention is described by way of example with reference to the accompanying drawings, in which:

FIG. 1 shows an IC card reader of the invention in its rest position;

FIG. 2 shows the reader with a card being inserted;

DETAILED DESCRIPTION

Figure 3:
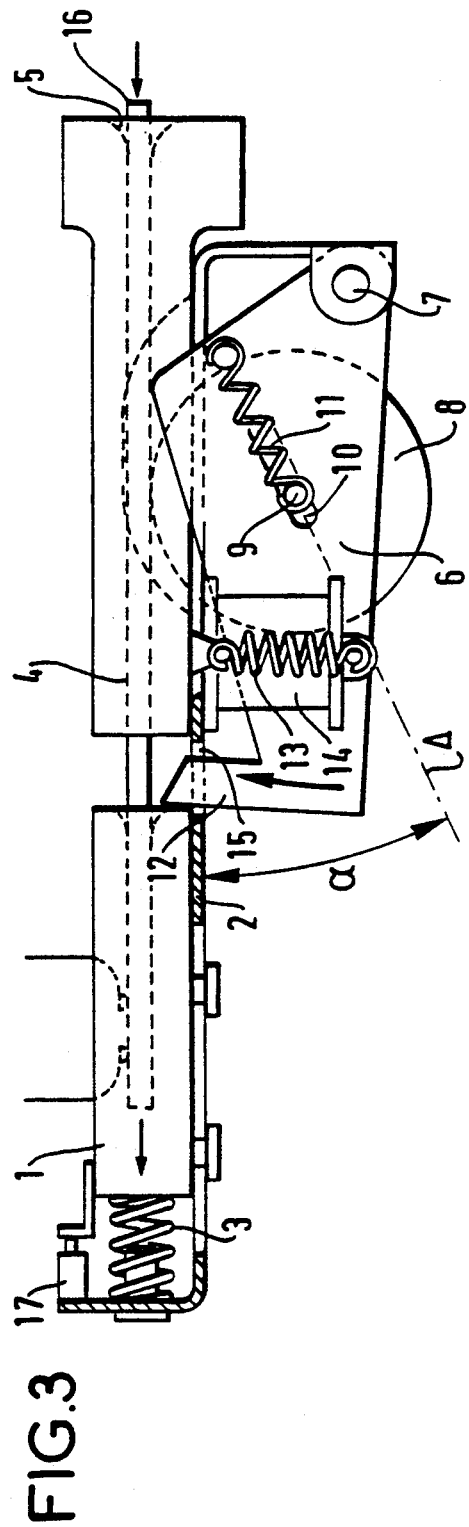
FIG. 3 shows the reader in the reading position, with the card fully inserted.

With reference to the figures, there can be seen an IC card reader including a connector 1 which is a conventional standard connector and which is slidably mounted on a support plate 2 with a return spring 3 mounted between the connector and the end of the plate 2.

Ahead of the connector 1 there is a guide channel 4 for an IC card, and preceded by an insertion slot 5.

A cradle 6 is situated beneath the guide channel 4 and is pivotally mounted about a stationary axis 7 fixed relative to the support plate 2. The axis 7 is perpendicular to the direction of the guide channel 4 and it is situated at the front end of the apparatus, i.e. at the insertion slot end 5.

A roller 8 is mounted in the cradle 6. The roller has an axis 9 extending parallel to the axis 7 and guided at both ends in respective slots 10 in each flank of the cradle 6. The roller 8 is thus free to move in translation along the slots 10 whose axes $\Delta$ are at an angle $\alpha$ relative to the channel 4. The angle $\alpha$ varies as a function of rotation of the cradle 6 about its axis 7, but it is always acute. The roller is provided with two return springs 11 urging it towards the line of intersection between the plane of the channel 4 and the plane containing the axes $\Delta$ and the axis 9 of the roller. The rear end of the cradle includes a locking catch 12 whose function is explained below and which also serves as an abutment for the cradle. The cradle 6 is provided with a spring 13 tending to close the angle $\alpha$. In addition, the cradle 6 is fitted with an electromagnet 14 which acts, when powered, to tend to open the angle $\alpha$. The electromagnet 14 is more powerful than the spring 13.

In the rest position of the reader as shown in FIG. 1, the roller 8 closes the guide channel 4, and the locking catch 12 of the cradle 6 is in abutment against the connector 1, passing through an opening 15 in the plate 2.

The roller 8 is made of metal or is rubber-covered, and it is preferably rubber-covered. The coefficient of friction between the roller 8 and a card has a value equal to $\mu$. The coefficient of friction $\mu$ is known to be equal to $\mu \tan \beta$ where $\beta$ is the friction angle. Thus, to wedge a card inserted in the insertion channel 4 between the roller 8 and the top wall of the channel 4, the angle $\alpha$ must be less than said friction angle $\beta$. It is therefore advantageous for the coefficient of friction $\mu$ to be relatively large so that the angle $\alpha$ enabling wedging to take place is not too small, and it is therefore preferable for the roller to be rubber-covered so that the coefficient of friction is relatively large. In the rest position as shown in FIG. 1, the angle $\alpha$ is less than the friction angle $\beta$.

Figure 5:
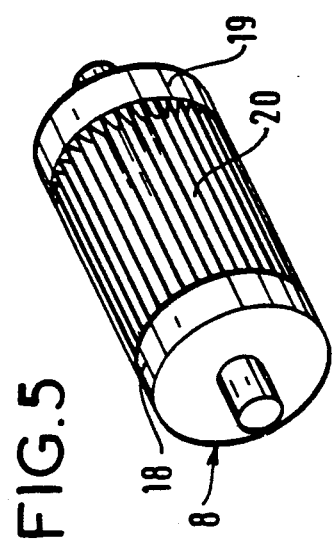
FIG. 5 shows an example of a special roller that does not completely lock the card in place during reading, but that allows it to be withdrawn with a specific force.

In FIG. 2, an IC card 16 is inserted into the reader and it pushes back the roller 8 with a force that is relatively small, e.g. being about 2N. Continued movement by the card 16 engages it in the connector 1 until the connector, being pushed home, slides backwards and actuates a contact 17. In this position, FIG. 3, the locking catch 12 locks the connector 1 in place and the operation of processing the card begins. If the user seeks to withdraw the card during this operation, one end of the card remaining permanently within reach, this is made impossible since the harder the user pulls on the card the more firmly the roller 8 wedges the card since the roller is free to slide in the slots 10. If it is desired to put a limit on the extraction force, e.g. 20 N, it is possible to use a roller that does not have a smooth surface, but that has a surface as shown in FIG. 5 with smooth ends 18 and 19 and a central portion comprising a series of rubber blades 20 extending radially. This central portion extends at least across the width of a card 16. By bending the blades, this disposition makes it possible to avoid locking the card completely, even at an angle $\alpha < \beta$, thus putting a limit on the extraction force.

Once the card has been processed, the electromagnet 14 is powered, the angle $\alpha$ opens and the card 16 is pushed back by the return spring 3 of the connector. The user can then withdraw the card freely (see FIG. 4).

Figure 4:
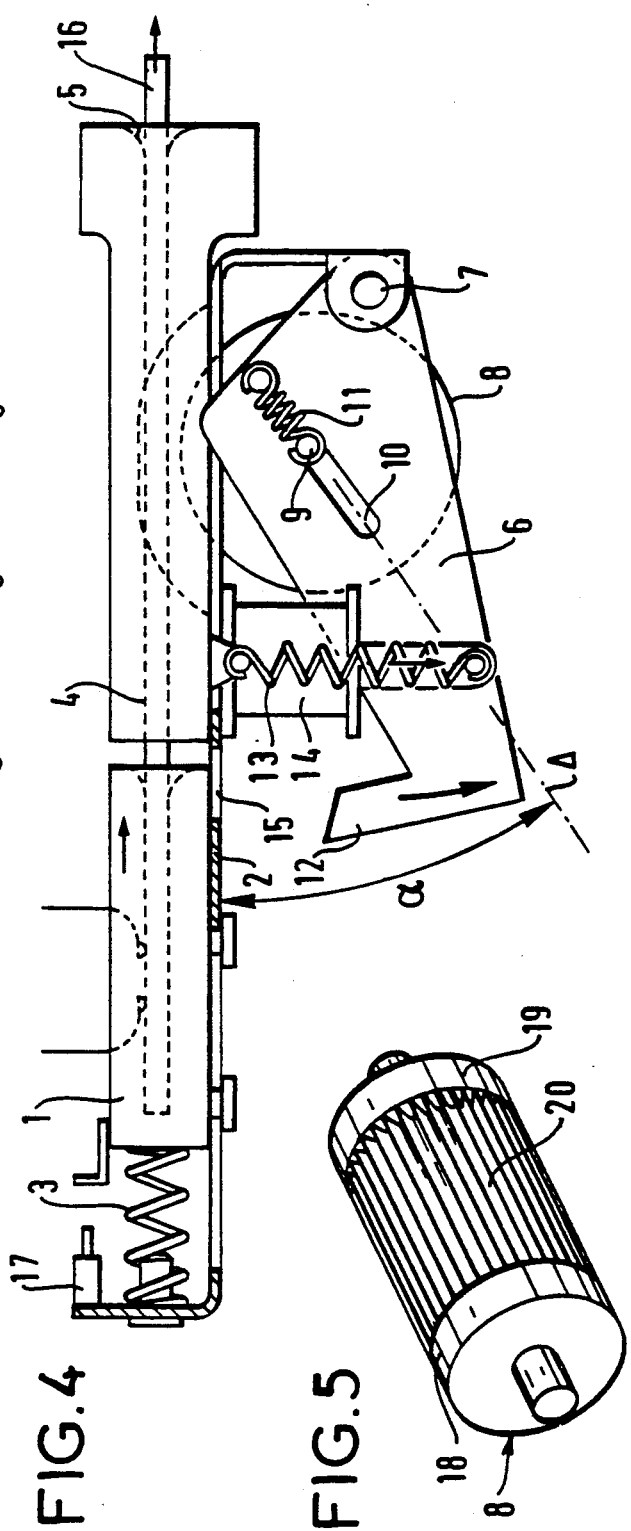
FIG. 4 shows the reader in the ejection position.

In the FIG. 4 position, the roller 8 disengages the insertion channel 4 completely, thereby facilitating thrusting of the card by the connector 1.

In the rest position, FIG. 1, it may be observed that the roller obstructs the insertion channel, thereby preventing liquid being sprayed into the reader.

I claim:

1. An IC card reader comprising an insertion slot followed by a guide channel at the end of which a standard connector is situated, wherein:

the reader includes a cradle pivoting about a stationary axis perpendicular to the direction of the guide channel and situated on one side of the insertion slot, and a roller whose axis extends parallel to said stationary axis being mounted in the cradle and being free to move in translation along a direction $\Delta$ perpendicular to its axis, said direction $\Delta$ being at an acute angle $\alpha$ relative to the direction of the guide channel;

said cradle includes resilient return means tending to close said angle $\alpha$, and drive means acting on control and more powerful than said return means tending to open said angle $\alpha$;

said roller includes resilient means pulling the roller along said direction $\Delta$ towards the line of intersection between the plane of the guide channel and the plane containing the axis of the roller and said direction $\Delta$;

in the rest position of the reader prior to a card being inserted therein, said roller obstructs said channel; and when a card is fully inserted in the reader, at least a portion of the card remains outside the reader, the cradle being in abutment in a position where said angle $\alpha$ is less than the angle $\beta$ whose tangent is equal to the coefficient of friction $\mu$ between said roller and said card, said drive means being powered after the card has been processed so as to open said angle $\alpha$ and enable the card to be withdrawn.

2. A reader according to claim 1, wherein the standard connector is slidably mounted on a plate, insertion of a card into the reader causing the connector to move backwards and compressing a return spring.

3. A reader according to claim 2, wherein the rear portion of said cradle has a locking catch which, when the card is in its pushed-in position and in the absence of power being applied to said drive means, holds the connector in its pushed-back position.

4. A reader according to claim 1, wherein the surface of the roller is smooth.

5. A reader according to claim 1, wherein the two ends of the roller have smooth surfaces while the central portion of the roller includes a series of flexible radial blades extending over a width not less than the width of the card.

* * * * *